Patented July 25, 1933

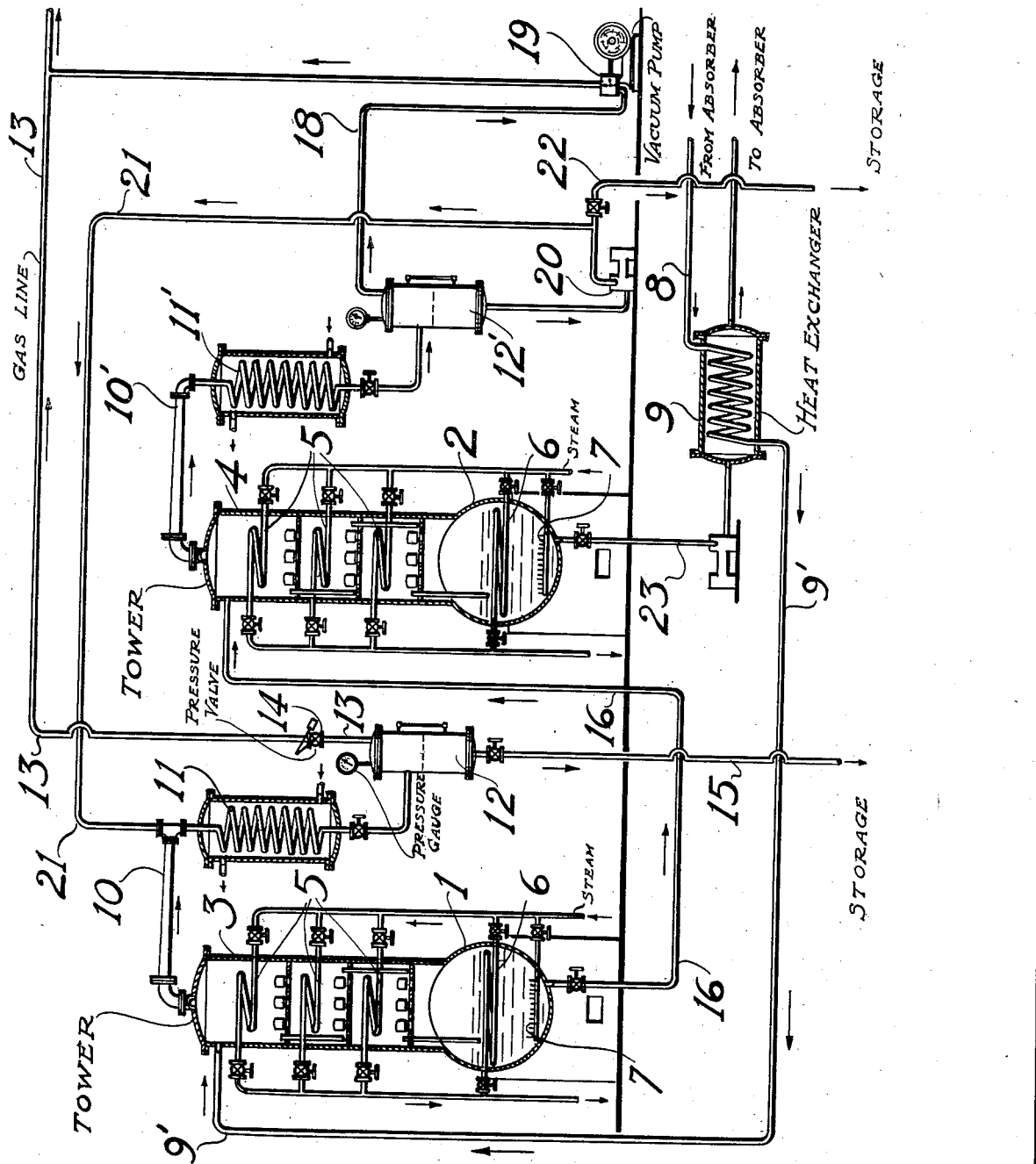

1,919,594

UNITED STATES PATENT OFFICE

WARREN K. LEWIS, OF NEWTON, MASSACHUSETTS, ASSIGNOR TO STANDARD OIL DEVELOPMENT COMPANY, A CORPORATION OF DELAWARE

PROCESS FOR RECOVERING VOLATILE LIQUIDS FROM SOLVENTS AND THE APPARATUS THEREFOR

Application filed February 1, 1928. Serial No. 250,999.

The present invention relates to the art of recovering volatile liquids and more specificially comprises a process for completely and efficiently distilling such liquids from their solutions in less volatile solvents. My method and the apparatus for accomplishing the method will be fully understood from the following description and the drawing, which illustrates a suitable apparatus. The description will be given with special reference to the method employed in the stripping of gasoline from absorption oil.

The drawing is a semi-diagrammatic view of a suitable stripping apparatus taken in vertical section and illustrates the course of material throughout the process.

Vapors of volatile liquids are often recovered from their mixtures with gases by absorption in a less volatile solvent, from which the volatile components may be subsequently distilled. Such processes are widely used to recover gasoline from natural gas, still gas, coal gas and the like. The process of stripping the absorbed oil from the solvent oil is generally inefficient and uneconomical due to the fact that the stripping column is usually operated under a pressure in order to condense the vapors without refrigeration and large quantities of steam are consequently required to completely denude the absorption oil of the heavier part of dissolved constituents. My method has for its object the complete and efficient stripping of such solvents. It will be described, for example, in connection with the removal of gasoline constituents from absorption oil, such as gas oil, but the invention is not limited thereto. Other uses are in the separation of lower boiling alcohols from admixture with higher boiling alcohols, the separation of alcohol water mixtures, the stripping of organic compounds, such as ketene, from its or their solutions in acetone or other solvents, etc.

Referring to the drawing, two stills indicated by reference characters 1 and 2 are surmounted by towers 3 and 4 respectively. The towers are of the well-known bell cap type, although packed towers or other types affording contact between vapor and liquid may be used. Heating coils 5 are distributed throughout the towers 3 and 4 and are arranged for the passage of steam or other heating medium. The coils are valved so that the flow of the heating mediums may be regulated to each coil. Stills 1 and 2 may be heated in any preferred manner, for example, by fire, but steam heating is preferred and closed coils 6 are shown within the stills. Spray pipes 7 are also provided within the still so that open steam or other inert vapors may be injected into the oil according to the usual practice.

Rich oil is fed by pipe 8 to a heat exchanger 9 and thence preferably to the upper part of the tower 3 by pipe 9'. Vapors are conducted by vapor line 10 to condenser 11 and to separator drum 12. Uncondensed gas leaves the drum by a line 13 on which a valve 14 is placed so that superatmospheric pressure may be maintained on still 1, tower 3, condenser 11 and drum 12. The liquid is removed from the drum by line 15 to storage, where the condensed water may be drawn off.

Bottoms from still 1, which is under pressure, is released through a valved pipe 16 and discharged into the upper part of tower 4. Vapor line 10' conveys vapor to condenser 11' and a cooled mixture of liquid and gas is emptied into separator drum 12'. The system, comprising still 2, tower 4, condenser 11' and drum 12', is maintained under reduced pressure by vacuum pump 19, which communicates with drum 12' by a line 18. Liquid is removed from drum 12' and is preferably discharged into vapor line 10 by pump 20 and line 21, but the distillate may be removed to separate storage by line 22. Denuded absorption oil from still 2 is pumped through line 23 into heat exchanger 9 and thence after suitable cooling to an absorption system (not shown) to receive a fresh charge of volatile oils.

In the operation of my process the stripping is accomplished in steps, preferably two in number, although more may be used. The vapors evolved in the lower part of the tower have a stripping action as they pass up the tower. Still 2 and tower 4 are held at a pressure at least substantially lower than that in still 1 and tower 3, but the pressure in still 2 and its tower are not necessarily sub-atmospheric. Still 1 is maintained under a pressure between atmospheric and 100 lbs. per square inch. The operating pressure will vary according to the volatility of the components to be removed from the solvent and is maintained so that the components distilled from still 1 are condensed at the temperature of available cooling water. For example, in the recovery of light hydrocarbons from natural gas or the like, which contains propane and butane, the most suitable pressure is above 25 lbs. per square inch. In recovering light oils obtained from coke oven gases, still 1 may be conveniently held at atmospheric pressure. Only the lighter fractions are distilled in this step and the quantity of open steam admitted by spray pipe 7 may be small. Still 2 and tower 4 are maintained under reduced pressure and heavier fractions of the absorbed liquid are removed without the use of excessive quantities of steam. The pressure in still 2 may be adjusted to the most suitable value but it is preferred to operate between 2 and 10 inches of mercury absolute pressure. The quantity of steam admitted to each column is adjusted as will be readily understood.

Although my process has been particularly described in respect to the stripping of gasoline from absorption oil, it may be utilized whenever a mixture of low boiling liquids are to be distilled from a high boiling solvent. My process is not to be limited by any theory of the operation nor by any example given merely by way of illustration, but only by the following claims, in which I wish to claim all novelty inherent in my invention.

I claim:

1. Process for stripping volatile liquids from a less volatile solvent carrying the same, comprising passing the charged solvent successively downward through a plurality of series of contact zones heating the charged solvent progressively by a plurality of separate means, passing an inert vapor upwardly through each of the series of contact zones in counter-current direct contact with the charged solvent, collecting at the base of the first series of contact zones a supply of partly stripped solvent, forwarding solvent from this supply into the upper part of the second series of contact zones, heating the partly stripped solvent progressively by a plurality of separate means, collecting at the base of said second series of contact zones a supply of solvent from which the volatile liquid has been substantially removed, forwarding said stripped solvent for further absorption of volatile liquids and collecting from each of the series of contact zones a condensate of volatile liquid expelled therein.

2. Process for stripping low boiling hydrocarbons from a higher boiling solvent, comprising passing the mixture downwardly through two series of contact zones, heating the mixture progressively, maintaining pressure in the first series of zones in excess of 25 lbs. per square inch and below 100 lbs. per square inch, maintaining the pressure between two and 10 inches of mercury absolute pressure in the second series of zones and admitting a controlled supply of steam to each series of zones into direct contact with the mixture whereby a part of the low boiling hydrocarbons are vaporized from the mixture in the first series and the remainder is completely vaporized in the second series.

3. Apparatus of the class described, comprising a pair of stills, a pair of rectifying columns in direct communication with the stills, means for maintaining the first still and column under superatmospheric pressure, means for maintaining the second still and column under subatmospheric pressure, means for passing liquid downwardly through the two columns into the stills in series, regulable heating means distributed throughout the columns and stills, regulable means for injecting steam into the stills, vapor lines, condensers and means for forcing the distillate from the second column into the vapor line of the first column.

4. An improved process for removing absorbed volatile liquids from less volatile solvents, comprising passing the heated charged solvent downwardly through a plurality of series of contact zones, heating the charged solvent by a plurality of separate heating means, passing steam upwardly through each of the series of contact zones and in direct countercurrent contact with the charged solvent, maintaining a superatmospheric pressure in the first of such series of zones, maintaining lower pressures in the succeeding series of zones, removing distillates from each of said series of zones, and condensing liquid fractions from each of said distillates.

5. An improved process for removing absorbed volatile liquids from less volatile solvents, comprising passing heated charged solvent downwardly through two series of contact zones, heating the charged solvent passing downwardly by a plurality of separate heating means, passing on indifferent vapor upwardly through each of the series of zones to assist in vaporization of the lighter liquid, maintaining the first of such series at pressure between about 25 and 100 pounds to a square inch and the second substantially below such pressure, and removing condensable vapor from each series of zones.

6. An improved process for removing absorbed volatile liquids from less volatile solvents, comprising passing the heated charged solvents downwardly through a plurality of series of contact zones, heating the charged solvent by a plurality of separate heating means, passing steam upwardly through each of said series to assist in vaporization of the lighter liquid, maintaining the first series of zones at pressure between about 25 to 100 pounds per square inch and the succeeding series of zones at a lower pressure not above atmospheric, and removing vapors from each series of zones.

7. An improved process for removing absorbed volatile liquids from less volatile solvents, comprising passing the heated charged solvents downwardly through a plurality of series of contact zones, heating the charged solvent by a plurality of separate heating means, passing steam upwardly through said series to assist in vaporization of the lighter liquid, maintaining the first series of zones at pressure between about 25 to 100 pounds per square inch and the succeeding series of zones at a lower pressure not substantially above atmospheric, removing vapors from each series of zones and adding a portion of the distillate from the second series of zones to the vapors from the first series of zones and condensing such mixture.

8. An improved process for stripping a gasoline fraction from less volatile solvent, comprising passing the heated gasoline charged solvent downwardly through a plurality of series of contact zones, heating the charged solvent passing downwardly by a plurality of separate heating means, passing steam upwardly through said series to assist in vaporization of the gasoline fraction, maintaining the first of such series at pressure between about 25 and 100 pounds per square inch and the second substantially below such pressure, removing a gasoline fraction from each series of zones, adding a portion of the distillate from the second series of zones to the vapors from the first series of zones, and condensing such mixture.

9. An improved process for stripping absorbed gasoline from a less volatile hydrocarbon oil solvent, comprising passing the charged solvent downwardly through a plurality of series of contact zones, passing a vapor, adapted to strip gasoline from the solvent, upwardly from the lower portion of each series of contact zones, supplying positive heating to the said charged solvent before it reaches the lower portion of the first series of contact zones and within said first series, liberating said vapor in the lower portion of each series of contact zones, passing the partly stripped solvent without material abstraction of heat from the lower portion of each series of contact zones to the upper portion of the next succeeding series of contact zones, maintaining the first of such series of contact zones at super-atmospheric pressure, maintaining a substantially lower pressure in the succeeding series of contact zones, removing a distillate with avoidance of reflux from each of such series of contact zones, said distillate being taken off adjacent the level at which the solvent carrying gasoline constituents is introduced into the series of contact zones, and removing the solvent substantially free of absorbed gasoline from the last of said series of contact zones.

10. An improved process for stripping absorbed gasoline from a less volatile hydrocarbon oil solvent, comprising passing the charged solvent downwardly through a plurality of series of contact zones, passing a vapor, adapted to strip gasoline from the solvent, upwardly from the lower portion of each series of contact zones, supplying positive heating to the said charged solvent before it reaches the lower portion of the first series of contact zones, liberating said vapor in the lower portion of each series of contact zones, passing the partly stripped solvent without material abstraction of heat from the lower portion of each series of contact zones to the upper portion of the next succeeding series of contact zones, maintaining the first of such series of contact zones, at super-atmospheric pressure, maintaining a substantially lower pressure in the succeeding series of contact zones, removing a distillate from each of such series of contact zones, said distillate being taken off adjacent the level at which the solvent carrying gasoline constituents is introduced into the series of contact zones, and removing the solvent substantially free of absorbed gasoline from the last of said series of contact zones.

WARREN K. LEWIS.